United States Patent [19]

Azibert

[11] Patent Number: 4,576,384
[45] Date of Patent: Mar. 18, 1986

[54] SPLIT MECHANICAL FACE SEAL

[75] Inventor: Henri V. Azibert, Stoneham, Mass.

[73] Assignee: A. W. Chesterton Company, Stoneham, Mass.

[21] Appl. No.: 688,659

[22] Filed: Jan. 3, 1985

[51] Int. Cl.⁴ .............................................. F16J 15/38
[52] U.S. Cl. .................................... 277/81 S; 277/83; 277/93 R; 277/192
[58] Field of Search ..................... 277/81 R, 81 S, 83, 277/85, 87, 93 R, 93 SD, 101, 192, 193, 197

[56] References Cited

U.S. PATENT DOCUMENTS

| | | |
|---|---|---|
| 808,082 | 12/1905 | Fuller ................. 277/81 S |
| 1,467,256 | 9/1923 | Thomson . |
| 1,544,609 | 7/1925 | Somes ............... 277/81 R X |
| 3,025,070 | 3/1962 | Copes ................ 277/93 R X |
| 3,066,942 | 12/1962 | Schwing ............. 277/93 R X |
| 3,101,200 | 8/1963 | Tracy ................. 277/93 R |
| 3,421,769 | 1/1969 | Boop et al. ............ 277/58 |
| 3,599,990 | 8/1971 | Greiner et al. ........ 277/81 S X |
| 4,088,329 | 5/1978 | Junker ................. 277/26 |
| 4,410,188 | 10/1983 | Copes ................ 277/81 S X |

FOREIGN PATENT DOCUMENTS 81152 8/1934 Sweden ................................ 277/85

Primary Examiner—Robert S. Ward

[57] ABSTRACT

A split mechanical face seal comprising a pair of seal rings each comprising split ring segments secured about the circumference by securing means; the rings are non-ridgedly supported in an axial direction by resilient support means; at least one of the support means comprises biasing means axially biasing the sealing surface of the rings together.

19 Claims, 9 Drawing Figures

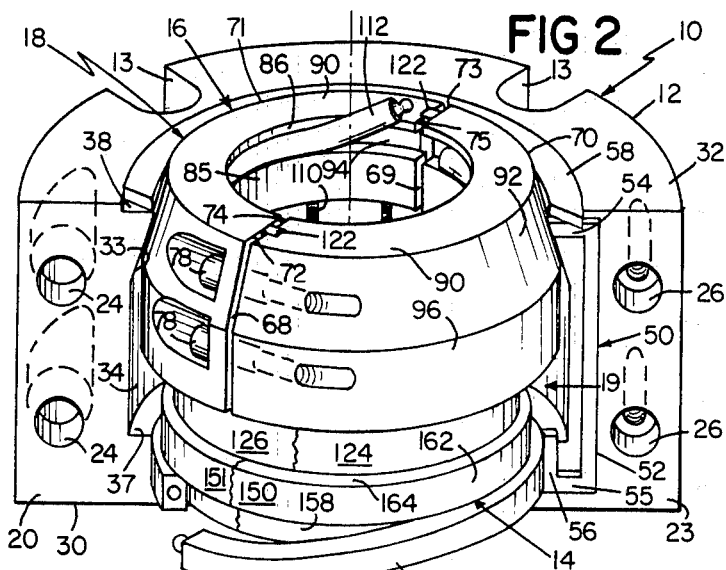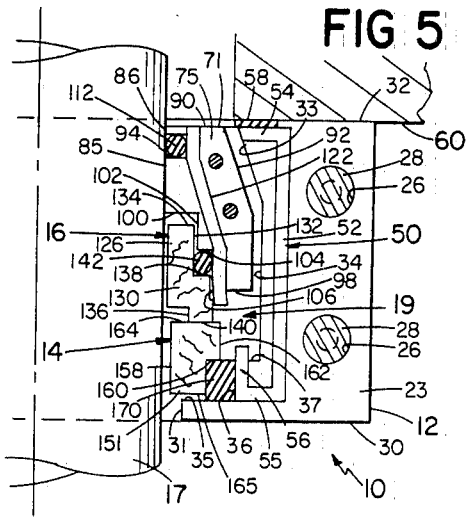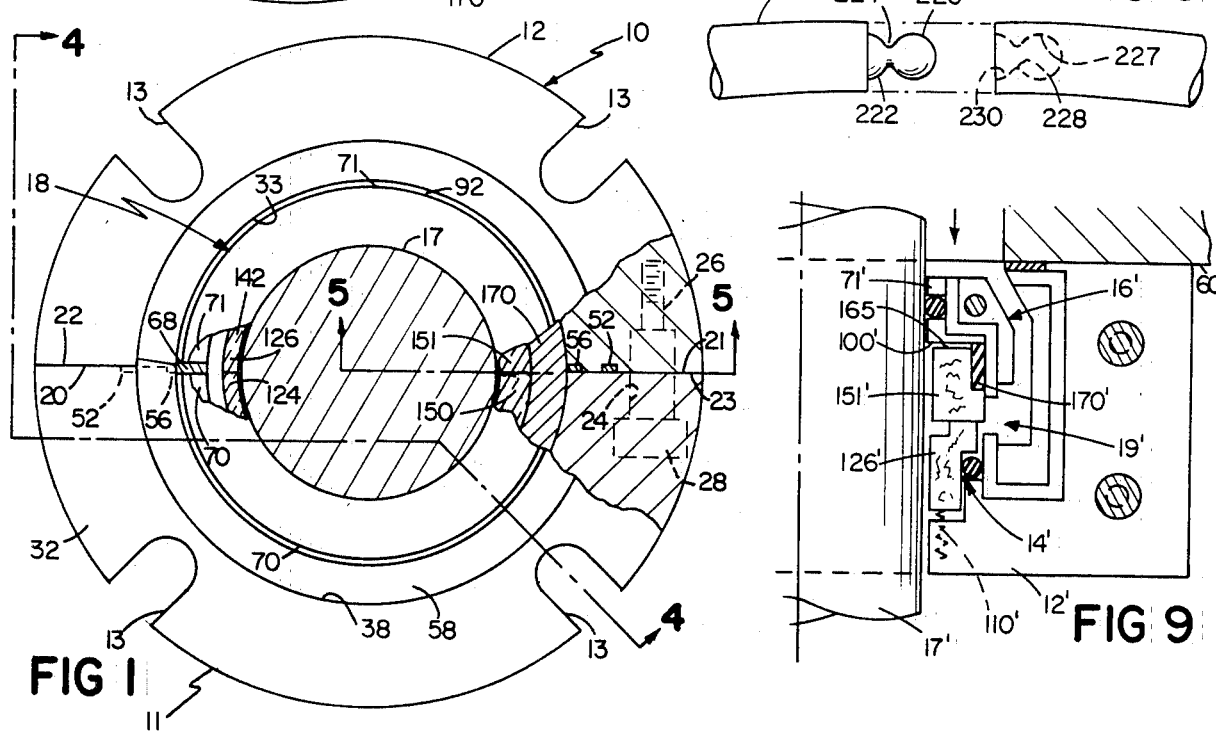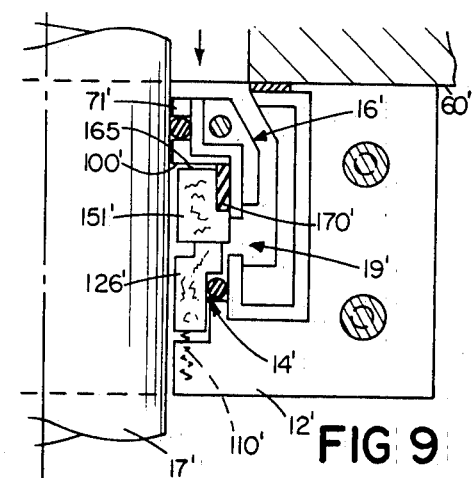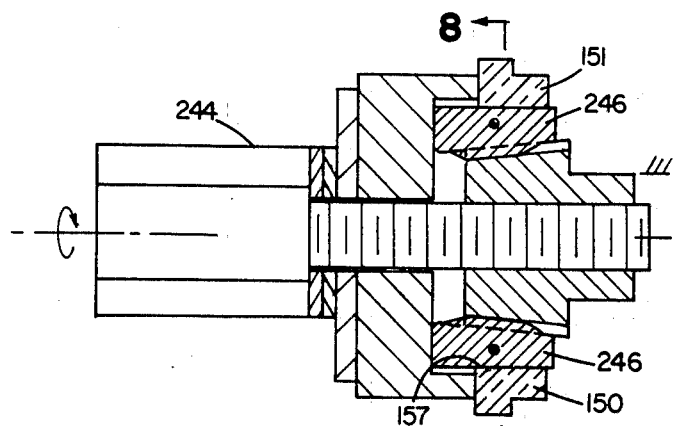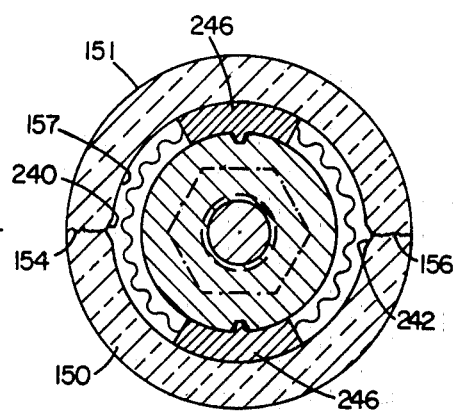

SPLIT MECHANICAL FACE SEAL

BACKGROUND OF THE INVENTION

This invention relates to mechanical seals for pumps and the like and more particularly to split mechanical face seals.

Mechanical seals are used on a wide variety of machines, e.g., pumps, having rotating shafts that pass through housings, in order to prevent leakage of pressurized fluids. In one type of mechanical seal, the rotary face seal, sealing is achieved by arranging at least two rigid, durable sealing rings having extremely flat radially extending sealing faces axially adjacent each other and concentrically about the shaft so that the faces are in sealing contact. One ring is held stationary in the seal housing or gland while the other rotates with the shaft.

Repair or replacement of parts of such seals is difficult whenever inaccessibility of the outboard end of the shaft or the location of the machine make it impossible to slip the seal off the end of the shaft. In such situations, the machines themselves must be disassembled.

A solution to this problem has been to split the sealing rings and other seal parts radially into two or more parts so that each ring may be removed from, and new rings reassembled within, the seal and about the shaft, as disclosed in, e.g., U.S. Pat. No. 3,101,200.

Such split rings are manufactured, typically, by cutting a whole ring into two segments. With cut rings, the cut faces of one ring segment thereby created are precisely lapped while discarding the other ring segment and mating the one segment with a segment from another whole ring, similarly machined, so as to form a segmented ring of the same dimensions as a whole ring. Broken rings are also known in the art in which the irregular broken surfaces permit self matching of the ring halves without lapping.

In any event, precise alignment of the seal ring faces in such seals is achieved by lapping the backs as well as the faces of the rings, and then mounting them in holders, usually of metal. The holders, themselves, must be carefully lapped to receive the lapped backs of the rings. Then, the ring/holder assemblies are precisely aligned and rigidly held with respect to each other by pins, screws, dowels or the like.

An object of the present invention is to provide a split face seal which eliminates the need for expensive and time consuming precision alignment and lapping of seal ring surfaces other than the sealing surfaces themselves. Another object of the invention is to provide sealing functions in a split seal which are enhanced by fluid pressure.

SUMMARY OF THE INVENTION

In general the invention features a pair of seal ring assemblies in a split mechanical face seal. Each ring assembly comprises a rigid seal ring of split ring segments and securing means extending about the circumference thereof holding the segments together. The rings each have a flat, radially extending sealing surface, the sealing surfaces of the rings in sealing contact with each other. Resilient support means contact and nonrigidly support each ring axially on a side thereof opposite the sealing surface, one such support means also biasing the rings and sealing surfaces thereof together.

In preferred embodiments, the seal further comprises a seal gland having gland halves fastened together defining a chamber therewithin. One of the seal ring assemblies comprises one seal ring and is supported by the gland in the chamber. The other seal ring assembly comprises a holder comprised of holder halves fastened together supporting the other of the seal rings, the holder adapted for connection to a shaft and for rotation therewith. The rings are exposed about a portion of their outer circumference to the chamber and fluid pressure therein which assists in holding the ring segments together.

The rings comprise ring halves and have adjacent irregular mating split faces in mating contact with each other. An elastomeric member extending about the one seal comprises the securing and resilient support means for the one seal, supporting the one seal in spaced relation to the rigid walls of the seal gland, the member contacting opposed radially extending surfaces of the one wall and the gland. Similarly an elastomeric member extending about the other seal comprises the securing and resilient support means for the other seal, supporting the other seal in spaced relation to the rigid walls of the holder, the member contacting opposed radially extending surfaces of the one wall and the holder. The resilient support means for one of the seals also comprises compression springs, the springs biasing the sealing surfaces of the rings together.

The holder halves are spaced apart to form gaps at their split faces. A groove on the interior surface of the holder has an elastomeric member therein for sealing the shaft. A groove in one of each pair of split holder faces has a gasket therein sealing the gap therebetween, the groove and gasket exposed to and the gasket contacting the elastomeric members in the interior groove of the holder and supporting the other seal ring therein. The gasket has a lower durometer than that of the elastomeric members which it contacts.

An elastomeric gasket is also provided in a groove provided in one of each pair of split faces of the gland. The gland gasket extends between end walls of the gland and, at one end, is reversed in a U-shaped configuration to contact the elastomeric member supporting the one seal ring in the gland, the gasket having a lower durometer than that of the supporting elastomeric member. At the other end, the gasket extends radially inwardly and is exposed to and contacts a face gasket in an annular recess in an end wall.

DESCRIPTION OF THE PREFERRED EMBODIMENT

We first briefly describe the drawings.

Drawings

FIG. 1 is a plan view of a split seal, partially broken away;

FIG. 2 is an isometric view of one seal gland half and the inner seal assemblies;

FIG. 5 is a fragmentary view partially in section of the seal half illustrated in FIG. 1, taken along the line 5—5 of FIG. 1;

FIG. 6 is an enlarged fragmentary view of the mating free ends of an elastomeric ring;

FIG. 7 is a sectional view of an expandable arbor and a sealing ring;

FIG. 8 is a sectional view taken along line 8—8 of FIG. 7; and

FIG. 9 is a view similar to that of FIG. 5 of an alternate embodiment.

Structure

Figure 4:
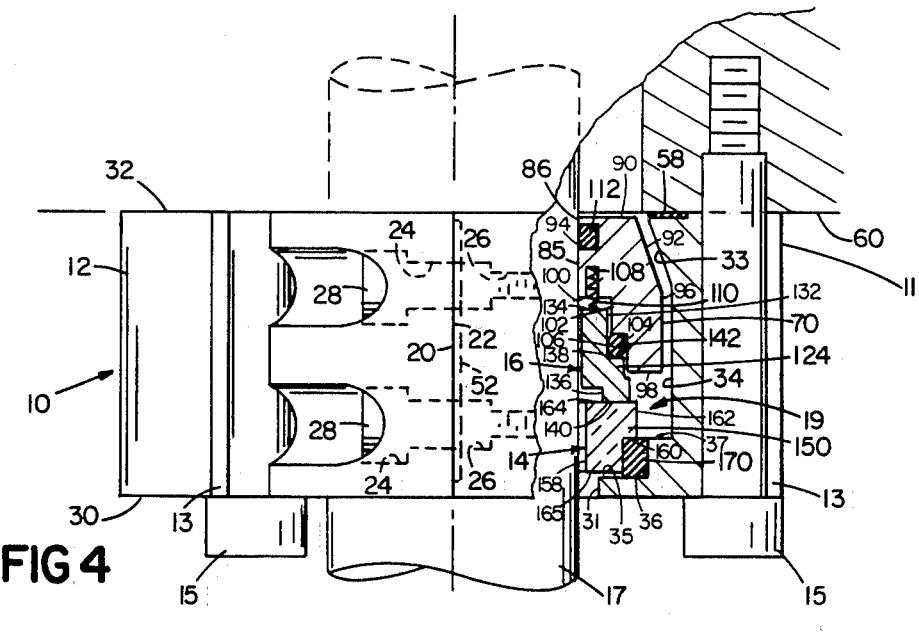
FIG. 4 is a side view, partially broken away, of the seal, taken along the line 4—4 of FIG. 1, mounted on a shaft and bolted to a mounting surface.

Referring to the drawings, particularly FIG. 1, mechanical seal 10 comprises a seal gland having two identical stainless steel gland halves 11, 12 each of which has two fastener recesses 13 to accomodate bolts 15, shown in FIG. 4, to mount seal 10 about shaft 17 to a mounting surface 60 of a pump or the like. Gland plate halves 11, 12 together define seal chamber 19 housing stationary split seal ring assembly 14, and rotary split seal ring assembly 16, as shown in FIG. 2. Seal 10 defines a central axially extending opening for receiving shaft 17 therethrough.

Figure 3:
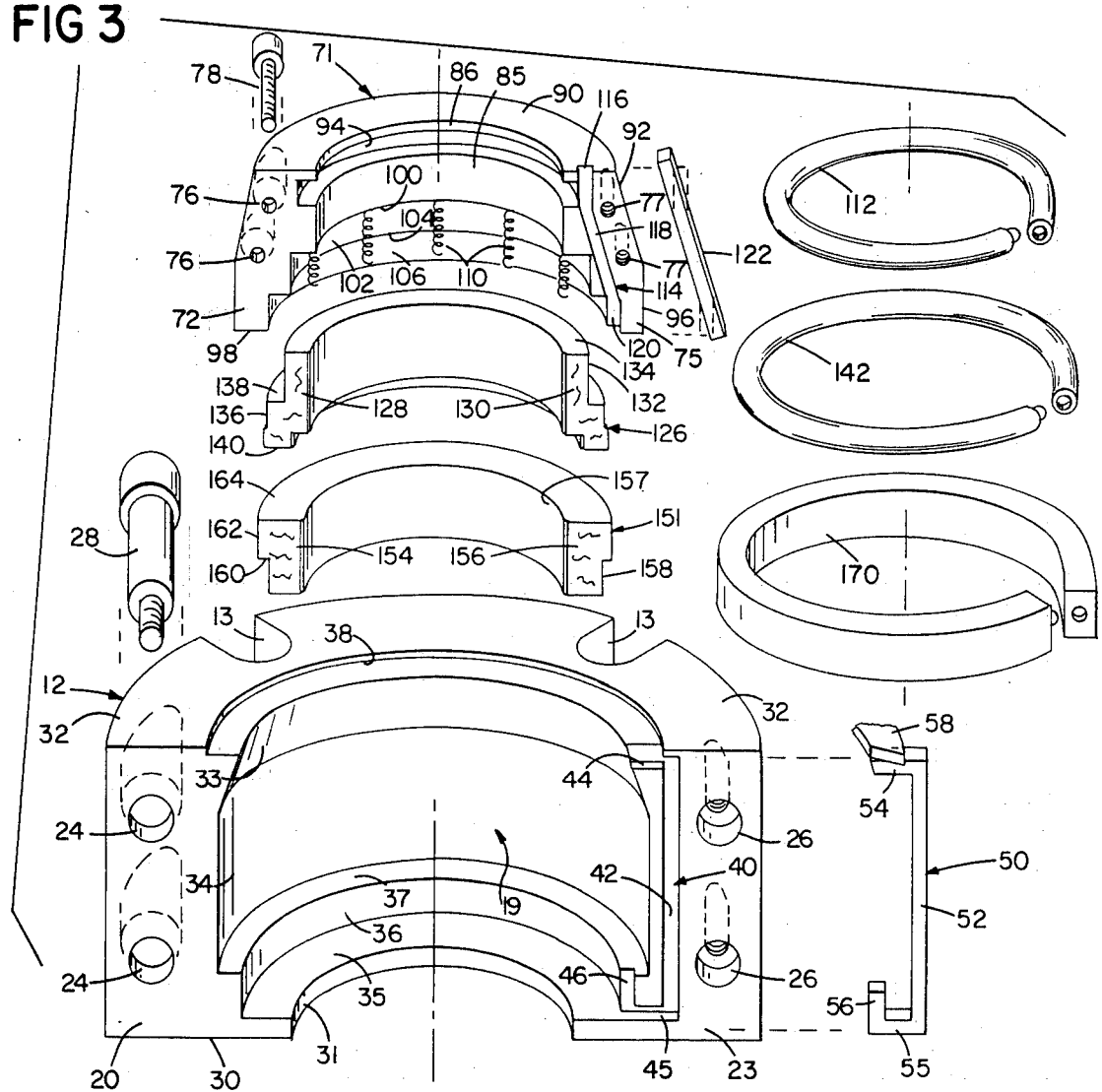
FIG. 3 is an exploded isometric view of a split seal half and internal elastomeric seals.

Gland halves 11, 12 are identical. As illustrated in FIGS. 1, 2 and 3, gland halves 11, 12 have, respectively, smooth split gland faces 20, 21 and grooved split gland faces 22, 23. Smooth faces 20, 21 have two axially spaced untapped holes 24 and grooved faces 22, 23 have two axially spaced partially tapped and partially untapped holes 26. Gland halves 11, 12 are assembled, as shown in FIG. 1, with the smooth faces 20, 21 opposing, respectively, the grooved faces 22, 23; and shoulder socket head cap screws 28 are inserted through untapped holes 24 and screwed into tapped holes 26 to secure the gland halves 11, 12 together, the shoulder portions of screws 28 engaging the untapped walls of holes 24, 26 to align the gland halves 11, 12.

Best shown in FIGS. 3 and 4, one end wall 30 of gland halves 11, 12 has a central opening defined by axial wall 31 slightly larger than the diameter of shaft 17 to provide clearance as the shaft projects therethrough. The other end wall 32, comprising a mounting wall, has a coaxial opening defined by wall 33 larger than the opening in the mounting surface 60 of the pump or the like to which it is to be attached, as shown in FIGS. 4 and 5. Internal axially extending wall 34 has an enlarged diameter relative to the openings defined by walls 31 and 33 and defines the major internal diameter of seal chamber 19. Wall 33 tapers outwardly from the opening which it defines to wall 34. Best shown in FIG. 3 radial wall 35 extends outwardly from wall 31 to a step formed by axial wall 36 and radial wall 37, the latter joining wall 34.

Mounting wall 32 is provided with a recess 38 about the opening defined by wall 33 to receive a split elastomeric face gasket 58 adhesively secured thereto, face gasket 58 having an axial dimension greater than the depth of recess 38, as shown in FIGS. 2 and 3. The inner diameter of face gasket 58 is equal to that of the opening defined by wall 33.

The grooved split gland faces 22, 23 of the gland halves are each provided with a groove 40 of generally square cross section. The major segment 42 of groove 40 extends axially between end walls 30, 32, spaced radially between seal chamber 19 and holes 26. Adjacent end wall 32 a segment 44 of the groove extends at right angles from segment 42 to wall 33, segment 44 being located below and exposed to recess 38. Adjacent end wall 30, groove 40 is reversed in a generally U-shaped configuration, a segment 45 of the groove extending at a right angle from segment 42, in line with radial wall 35, to axial wall 36; another groove segment 46 extending at a right angle from segment 45 to radial wall 37, segment 46 exposed to axial wall 36.

An elastomeric gland gasket 50, preformed to the configuration of groove 42, is placed in the groove, best shown in FIGS. 2 and 5. Gland gasket 50 comprises segments 52, 54, 55, 56 corresponding respectively to groove segments 42, 44, 45, 46. Gland gasket 50 in groove 42 projects thereabove for sealing contact with a mating ungrooved split face 20, 21 of another gland half. Segment 56 of gasket 50 projects above groove segment 46 beyond wall 36 and projects a short distance beyond the end of groove segment 46. At the other end, segment 54 of the gland gasket projects to or slightly above groove segment 44 for sealing contact with face gasket 58; the end of segment 54 is cut at a tapered angle, the direction of the taper being the same as the taper of wall 33. The split ends of face gasket 58 are arranged to meet at a position offset slightly, e.g. ⅛ inch, from the split between the gland halves and segment 54.

As illustrated in FIGS. 2 and 3, rotary split seal ring assembly 16 is provided within the gland, formed by gland halves 11, 12, adjacent tapered wall 33. Assembly 16 comprises a holder having two identical holder halves 70, 71, each having, respectively, smooth split holder faces 72, 73, and grooved split holder faces 74, 75. Smooth faces 72, 73 have two untapped fastener holes 76; and grooved faces 74, 75 have two tapped fastener holes 77. Holder halves 70, 71 are assembled with the smooth faces 72, 73 opposing, respectively, the grooved faces 74, 75. Faces 72, 74 and 73, 75 when holder assembly 18 is assembled on a shaft 17, define, respectively, gaps 68 and 69 between the holder halves 70, 71. Socket head cap screws 78 are inserted through untapped fastener holes 76 and screwed into tapped fastener holes 77 to secure the holder halves 70, 71, together.

Radial end wall 90 of holder halves 70, 71 has an outer diameter slightly smaller than the opening defined by gland walls 32, 33 thereadjacent. The inner diameter of holder halves 70, 71 adjacent wall 90 defined by inner axial walls 85, 86 is equal to the diameter of the shaft 17 to which the holder is to be attached, gaps 68, 69 functioning to permit tightening the holder halves 70, 71 to the shaft despite tolerance variations in shaft diameter. O-ring groove 94 is provided between the inner walls 85, 86. Split O-ring 112 is positioned in groove 94 for sealing against shaft 17 as shown in FIGS. 4 and 5.

The outer diameter of the holder halves 70, 71 expands from end wall 90 via tapered wall 92 to a diameter at outer axial wall 96 greater than the opening defined by gland walls 32, 33 but less than the inner diameter of wall 34 of the gland halves. Internally, beyond wall 85 toward end wall 98, the inner diameter of the holder halves 70, 71 is increased in steps. Radial wall 100 extends outwardly from wall 85 to axial wall 102. Radial wall 104 extends outwardly from wall 102 to axial wall 106 which in turn extends to end wall 98. Holes 108 drilled in radial wall 100, shown in FIG. 4, have compression springs 110 mounted therein, springs 110 in an uncompressed state extending to radial wall 104, best shown in FIG. 3.

Grooved split holder faces 74, 75 each have a groove 114 of generally square cross section. Groove 114 comprises axially extending segments 116, 120 and an angled segment 118 connecting the end segments 116, 120. Groove segment 116 is positioned at and exposed to the base of O-ring groove 94 and extends completely across and beyond the O-ring groove 94. Groove segment 120 is positioned outwardly of and exposed to axial wall 106, extending thereacross. A straight elastomeric holder gasket 122 of generally square cross-section is deformed and placed in groove 114. Holder gasket 122 projects above groove 114 for sealing contact with a mating ungrooved split face of another holder half. At groove segments 116 and 120, gasket 122 projects, respectively, inwardly beyond the base of O-ring groove 94 for sealing contact with O-ring 112 and inwardly beyond axial wall 106 for sealing contact with O-ring 142.

Rotary seal assembly 16 also comprises carbon split rotary seal ring segments, i.e., halves 124, 126, positioned within the holder halves. Rotary seal ring halves have mating irregular split faces 128, 130. The inner diameter of the rotary seal ring halves is greater than the shaft 17 diameter to permit axial motion therealong. A support portion 132 has an outer diameter slightly smaller than that of axial wall 102 of the holder halves 70, 71 and has an end wall 134 engaging the free ends of springs 110 which provide resilient support means axially biasing the rotary seal ring halves 124, 126. A seal portion 136 of the rotary seal ring halves, joined to the support portion 132 at radial wall 138, has an outer diameter within the holder halves slightly smaller than holder wall 106 and projects beyond the holder halves to radially extending flat rotary sealing surface 140.

Split O-ring securing means 142 is disposed and fastened about seal ring halves 124, 126 and has sufficient resilience to cause the engagement of irregular split faces 128, 130 of rotary seal ring halves 124, 126 in sealing contact with each other. As shown in FIG. 4, when mechanical seal 10 is assembled, split O-ring 142 is in sealing contact with holder walls 104, 106, and with support portion 132 and wall 138 of seal ring halves 124, 126 providing axial as well as radial support therefor and with springs 110 resiliently supporting the ring halves in spaced relationship to the rigid walls of the holder halves.

Of importance to the sealing function of O-rings 112 and 142, holder gasket 122 preferably has a lower durometer, e.g., 40–50, than of O-rings 112 and 142, e.g., 60–70. This prevents distortion of the O-rings where they make sealing contact with the gasket.

Stationary split seal ring assembly 14, best shown in FIGS. 3, 4 and 5, comprises alumina ceramic or silicon carbide split stationary seal ring segments, i.e., halves 150, 151. Stationary seal ring halves have mating irregular split faces 154, 156. The inner diameter of the stationary seal ring halves at wall 157 is greater than the shaft 17 diameter. As shown in FIGS. 3 and 4, a support portion 158 has an outer diameter smaller than that of axial wall 36 of the gland halves 11, 12. A seal portion 162 of the stationary seal ring halves, joined to the support portion 158 at radial wall 160, has an outer diameter somewhat smaller than that of gland wall 36 and projects axially therebeyond to radially extending flat stationary sealing surface 164 which sealingly engages flat rotary sealing surface 140.

Elastomeric ring boot securing means 170, rectangular in section, is disposed and fastened about split stationary seal ring halves 150, 151 and has sufficient resilience to cause the engagement of irregular split faces 154, 156 in sealing contact with each other. Boot 170 is positioned in sealing contact between gland wall 36 and support portion 158 of stationary seal ring halves 150, 151 and between gland wall 35 and radial wall 160 of stationary seal ring halves 150, 151. The axial dimension of boot 170 is greater than that of support portion 158 of stationary seal ring halves 150, 151 between radial wall 160 and end wall 165 thereby spacing end wall 165 axially away from gland radial wall 35 and providing resilient support means for the stationary seal ring halves 150, 151. The durometer of boot 170 is greater, e.g., 60–70, than that of gland gasket 50, e.g., 40–50, to avoid distortion of boot 170 at the point of sealing contact with gasket 50.

As generally illustrated in FIG. 3, identical ball and socket fastening mechanisms are provided on the free ends of split O-rings 112 and 142, and of ring boot 170. In greater detail with reference to O-ring 112, as shown in FIG. 6, at one end, O-ring 112 narrows to substantially hemispherical shoulder portion 222 and, adjacent thereto, annular neck portion 224. Immediately adjacent neck portion 224 is substantially spherical head portion 226. In fastening, head portion 224 is inserted into matching spherical socket portion 227 at the other end of O-ring 112 such that annular collar portion 228 surrounds and captures neck portion 224, and shoulder portion 222 is in intimate contact with annular jacket portion 230.

Manufacture

In manufacturing the gland halves 11, 12 and the holder halves 70, 71 a blank is cut in half. Alternatively, blanks for the gland halves and the holder halves may be cast. The halves are then joined and final internal diameters are then machined on conventional equipment. In the case of the holder halves, shims are used between the halves when they are joined to assure concentricity while controlling clearance gaps 68, 69 therebetween.

Rotary seal ring halves 124, 126 and stationary seal ring halves 150, 151 are split from whole rings finished to final dimensions before splitting. Rotary sealing surface 140 and stationary sealing surface 164 are each lapped to a flatness of two helium light bands. Thereafter the rings are split using the same technique. In greater detail with reference to the stationary ring and referring to FIGS. 7 and 8, the finished whole ring is first filed to form two axially extending V-shaped notches, 240, 242, 180° apart, on the inside wall 157 thereof. The ring is then placed on two movable segments 246 of an expandable arbor 224 with notches 240, 242 oriented 90° away from segments 246. As the arbor 244 is operated normally, segments 246 move radially outwardly against the ring causing the ring to split into ring halves 150, 151 at notches 240, 242. The fracture creates mating irregular split faces 154, 156. Advantageously, when the mating irregular faces are placed together, precise matching occurs without distortion of the finished dimensions.

Assembly and Operation

The tightening of gland cap screws 28 clamps stationary split seal assembly 14 to the gland formed by gland halves 11, 12. Thus, when seal 10 is mounted to a pump or the like, the gland and the stationary split seal assembly are held stationary.

The tightening of holder cap screws 78 clamps rotary split seal assembly 16 to shaft 17; and holder assembly 18 then drives rotary seal assembly 16 with shaft 17. As illustrated in FIG. 4 the holder 18 is mounted on shaft 17 in a position spaced from tapered gland wall 33, such that O-ring 142 is seated between opposing holder walls 104, 138 and 106, 132 of rotary seal ring halves 124, 126. Springs 110 and split O-ring 142 resiliently support the seal halves 124, 126 in spaced relationship to the walls of the holder halves 70, 71 and permit small radial and axial "floating" movements of rotary seal halves 124, 126 with respect to shaft 17 while still permitting rotary sealing surface 140 to follow stationary sealing surface 164. In operation, under fluid pressure, seal 142 may move away from wall 138 in which case axial resilient support is provided solely by springs 110. Because rotary seal halves 124, 126 "float", and are not held rigidly by holder assembly 18, neither end wall 134 nor any portion of the holder is lapped. Similarly, the resilient support of stationary seal ring halves 150, 151 by ring boot 170, resiliently supporting the seal halves 150, 151 in spaced relationship to the walls of the gland halves 11, 12, makes it unnecessary to lap back end wall 165. The spacing of stationary seal ring halves 150, 151 away from gland wall 35 permits the halves to float and move slightly in response to force transferred from rotary seal halves 124, 126. Thus, surfaces 140, 164 are self aligning as a result of the floating action.

The rotary and stationary seal ring halves 124, 126 and 150, 151, respectively, are held together by O-ring 142 and boot 170 compressed against walls 106 and 36. Advantageously, hydraulic pressure of fluid within chamber 19, exerted against the exterior walls of the ring halves at seal portions 136, 162, provides an additional force, proportional to the fluid pressure, holding the ring halves together.

O-ring 112 seals fluid flow along shaft 17 past rotary seal assembly 16. O-ring 142 and boot 170 seal fluid flow from chamber 19 past the rotary and stationary seal assemblies 16, 14, respectively, while flat seal surfaces 140, 164 seal between the relatively moving assemblies 14, 16.

Holder gaskets 122 compressed between holder halves 70, 71 seal fluid flow from chamber 19 past the gaps 68, 69 between the holder halves 70, 71. In addition, sealing is enhanced by increasing fluid pressure exerted on gaskets 122 from chamber 19 through gaps 68, 69. Gaskets 122 overlying O-rings 112, 142 provide sealing contact against the O-rings, enhanced by fluid pressure, while the difference in durometers of the gaskets 122 and O-rings 112, 142 assures that the O-rings remain undistorted. Gaskets 122 have a length such that they extend beyond the holder halves 70, 71 to and overlie the seal portions 136 of rotary seal ring halves 124, 126 prior to assembly on a shaft; thus during assembly, after rotary seal assembly 16 is secured to shaft 17, there is no tendency for gasket 122 to be distorted out of position by O-ring 142 or wall 138 of the rotary seal ring halves 124, 126 as the gland is moved for fastening to mounting surface 60.

Gland gaskets 50 are compressed between gland halves 11, 12 to seal fluid flow from chamber 19 past the gland halves. Any fluid pressure resulting from any leakage between the gland halves increases the sealing effect of the gland gasket elsewhere along its length and particularly of segment 56 against boot 170 and segment 54 against face gasket 58.

Other Embodiments

An alternate embodiment of the invention is illustrated in FIG. 9. Like the embodiment previously described, that of FIG. 9 comprises a seal gland 12' defining a seal chamber 19' housing stationary and rotary split seal ring assemblies 14', 16'. The most significant difference of the embodiment illustrated in FIG. 9 is that the spring biased face seal 126', biased by springs 110', is the stationary seal mounted to gland 12'. The other seal 151', secured by boot 170' is mounted in a holder 71', boot 170' spacing end wall 165' of seal 151' away from the facing radially extending wall 100' of holder 71'.

Yet other embodiments of this invention will occur to those skilled in the art which are within the scope of the following claims.

I claim:
1. A split mechanical face seal comprising:
a pair of seal ring assemblies, each said ring assembly comprising a rigid seal ring of split ring segments and securing means extending about the outer circumference of each said ring holding said segments thereof together;
said rings each having a flat radially extending sealing surface, the sealing surfaces of said rings being in sealing contact with each other; characterized in that
said rings are axially non-rigidly supported in said seal by resilient support means resiliently contacting and supporting each said ring axially on a side opposite the sealing surface thereof; and
at least one of said support means comprises biasing means axially biasing said rings and said sealing surfaces thereof together.

2. The split seal claimed in claim 1 further characterized in that one of said support means comprises an elastomeric member contacting a radially extending wall of one of said rings on the side opposite the sealing surface of said ring.

3. The split seal claimed in claim 1 further characterized in that said biasing means comprises compression springs contacting a radially extending wall of one of said rings on the side opposite the sealing surface of said ring.

4. The split seal claimed in claim 1 further characterized in that said securing means each comprise an elastomeric member extending about and resiliently engaging the circumference of one said ring.

5. The split seal claimed in claim 4 further characterized in that at least one of said resilient support means for said rings comprises one said elastomeric member, at least the other of said resilient support means comprises compression springs, said elastomeric members positioned between and contacting axially extending walls of said rings and opposed axially extending rigid walls of said seal and further positioned between radially extending walls of said rings on the sides thereof opposite said sealing surfaces and opposed radially extending rigid walls of said seal, at least said one elastomeric member contacting the radially extending wall of one said ring and the opposed radially extending rigid wall of said seal between which it is positioned, and said compression springs contacting a radially extending wall of the other of said rings on the side opposite the sealing surface thereof and an opposed radially extending rigid wall of said seal, said elastomeric members and said springs nonrigidly supporting said rings radially as well as axially in spaced relation from all rigid walls of said seal.

6. The split seal claimed in claim 5, comprising a seal gland comprised of gland halves fastened together and defining a chamber housing said seal ring assemblies therein, one of said seal ring assemblies comprises one of said seal rings supported by said gland in said chamber and in which the other of said seal ring assemblies comprises a holder within said chamber comprised of holder halves fastened together and adapted to be connected to and supported within said gland on a shaft extending into said gland, said holder supporting the other of said rings for rotation of said ring with said shaft, further characterized in that said seal ring assemblies further comprise said elastomeric members supporting said seal rings and holding the segments thereof together, respectively, one in said holder and one in said gland with said seal rings spaced from the rigid walls of said holder and said gland respectively.

7. The split seal claimed in claim 6 further characterized in that axially extending walls of said seal rings are at least partially exposed about their outer circumference to said chamber whereby said ring segments are adapted to be held together more firmly by fluid pressure in said chamber.

8. The split seal claimed in claim 6 further characterized in that said springs extend between said holder and said seal ring supported in said holder.

9. The split seal claimed in claim 6 further characterized in that said springs extend between said gland and said seal ring supported in said gland.

10. The split seal claimed in claim 6 further characterized in that said elastomeric member supporting said seal ring in said holder sealingly engages radial and axial walls of said holder and at least an axial wall of said seal ring in said holder against fluid flow therebetween, an elastomeric member is provided in a groove on the interior of said holder for fluid sealing engagement with a shaft, said holder halves comprise opposed split faces, and an elastomeric holder gasket extends between each pair of split faces of said holder halves, each said gasket exposed in sealing contact with and having a lower durometer than said elastomeric members supporting said seal ring in said holder and provided in said groove on the interior of said holder.

11. The split seal claimed in claim 10 further characterized in that said holder halves are spaced apart forming gaps therebetween at said split faces, a groove is positioned in one holder split face of each pair of faces and one said holder gasket is positioned in each groove extending thereabove and across the said gap between said faces in sealing contact with the holder face opposing said groove of said one holder face.

12. The split seal claimed in claim 11 further characterized in that said grooves in said holder faces and said holder gaskets therein are positioned radially outwardly of and are exposed to said groove on the interior of said holder and said elastomeric member therein and to said elastomeric member supporting said seal ring in said holder.

13. The split seal claimed in claim 6 further characterized in that said elastomeric member supporting said seal ring in said seal gland sealingly engages radial and axial walls of said gland and at least an axial wall of said seal ring in said gland against fluid flow therebetween, said gland halves comprise opposed split faces, and an elastomeric gland gasket extends between each pair of split faces of said gland halves each said gland gasket exposed in sealing contact with and having a lower durometer than said elastomeric member supporting said seal ring in said gland.

14. The split seal claimed in claim 13 further characterized in that a groove is positioned in one gland split face of each pair of faces and one said gland gasket is positioned in each groove in sealing contact with the gland face opposing said groove of said one gland face.

15. The split seal claimed in claim 14 further characterized in that said grooves in said gland faces and said gland gaskets therein are positioned radially outwardly of and are exposed to said elastomeric member supporting said seal ring in said gland.

16. The split seal claimed in claim 15 further characterized in that said groove in each gland face and said gland gasket therein each comprise a major segment extending axially between end walls of said gland, said major segment reversed radially inwardly upon itself at one end in a U-shaped configuration defining a further segment exposed to said elastomeric member supporting said seal ring in said gland said further segment of gland gasket in sealing contact therewith.

17. The split seal claimed in claim 16 further characterized in that said major segment is integrally connected at its other end to a radially inwardly extending segment, an annular recess is provided about said gland in the wall adjacent said radially inwardly extending segment and a face gasket is positioned in said recess of each gland half, and said radially extending segment is exposed to said recess and said face gasket with said radially extending segment of said gland gasket in sealing contact with said face gasket.

18. The split seal claimed in any one of the preceding claims further characterized in that said ring segments of each said ring comprise adjacent irregular mating split faces in mating contact with each other for accurately aligning the flat sealing surface thereof at said split faces.

19. The split seal claimed in claim 15 further characterized in that said rings each comprise a pair of ring segment halves.

* * * * *

UNITED STATES PATENT AND TRADEMARK OFFICE
CERTIFICATE OF CORRECTION

PATENT NO. : B1 4,576,384

DATED : June 30, 1992

INVENTOR(S) : Henri V. Azibert

It is certified that error appears in the above-identified patent and that said Letters Patent is hereby corrected as shown below:

Column 1, line 16:
    delete "The patentability of claims 1, 2, 4 is confirmed."
delete "the patentability of claims 1, 2, 4 is confirmed." and substitute therefor:

--The patentability of claims 1, 2, 4, and 18 depending from 1, 2 and 4, is confirmed.--.

Column 1, line 39 (Claim 5, line 6):
change "bers being positioned" to

--bers *being* positioned--;

Column 2, line 9 (Claim 20, line 2):
after "*said*" and before "*comprises*", please insert --*seal*--;

UNITED STATES PATENT AND TRADEMARK OFFICE
CERTIFICATE OF CORRECTION

PATENT NO. : B1 4,576,384
DATED : June 30, 1992
INVENTOR(S) : Henri V. Azibert

It is certified that error appears in the above-identified patent and that said Letters Patent is hereby corrected as shown below:

Column 2, line 20 (Claim 20, line 13:
after "*ring's*" change "*segment*" to --*segments*--;

Column 2, line 64 (Claim 23, line 16):
after "*gasket*" and before "*provided*", change "*bein*" to --*being*--.

Signed and Sealed this

Eighth Day of June, 1993

Attest:

MICHAEL K. KIRK

*Attesting Officer*    Acting Commissioner of Patents and Trademarks

REEXAMINATION CERTIFICATE (1729th)

United States Patent [19]

Azibert

[11] B1 4,576,384

[45] Certificate Issued  Jun. 30, 1992

[54] SPLIT MECHANICAL FACE SEAL

[76] Inventor: Henri V. Azibert, Stoneham, Mass.

Reexamination Request:
No. 90/002,380, Jun. 27, 1991

Reexamination Certificate for:
Patent No.: 4,576,384
Issued: Mar. 18, 1986
Appl. No.: 688,659
Filed: Jan. 3, 1985

[51] Int. Cl.⁵ .................................... F16J 15/38
[52] U.S. Cl. ........................... 277/81 S; 277/83; 277/93 R; 277/192
[58] Field of Search .......... 277/81 R, 220, 192, 277/85, 87, 81 S, 98, 104, 192, 220, 98, 99, 38–41, 93 R, 93 SD, 92

[56] References Cited

U.S. PATENT DOCUMENTS

| | | | |
|---|---|---|---|
| 808,082 | 12/1905 | Fuller | 277/81 S |
| 1,294,620 | 2/1919 | Clarke | 277/40 |
| 1,467,256 | 9/1923 | Thomson . | |
| 1,544,609 | 7/1925 | Somes | 277/81 R X |
| 2,503,086 | 4/1950 | Albright | 277/87 |
| 2,871,040 | 1/1959 | Payne | 277/87 X |
| 2,995,391 | 8/1961 | Snyder | 277/92 X |
| 3,006,667 | 10/1961 | Stephens | 277/815 S X |
| 3,014,742 | 12/1961 | Mayer | 277/93 R X |
| 3,025,070 | 3/1962 | Copes | 277/93 R X |
| 3,031,199 | 4/1962 | Laser et al. | 277/93 R X |
| 3,066,942 | 12/1962 | Schwing | 277/93 R X |
| 3,101,200 | 8/1963 | Tracy | 277/93 R |
| 3,421,769 | 1/1969 | Boop et al. | 277/58 |
| 3,536,333 | 10/1970 | Gits et al. | 277/87 X |
| 3,599,990 | 8/1971 | Greiner | 277/81 S X |
| 3,836,157 | 9/1974 | Hammer | 277/87 X |
| 3,837,658 | 9/1974 | Skinner et al. | 277/85 X |
| 3,941,394 | 3/1976 | Lukes | 277/40 |
| 4,088,329 | 5/1978 | Janker | 277/26 |
| 4,377,290 | 3/1983 | Netzel | 277/93 R X |
| 4,410,188 | 10/1983 | Copes | 277/81 S X |

FOREIGN PATENT DOCUMENTS

| | | | |
|---|---|---|---|
| 1675200 | 12/1970 | Fed. Rep. of Germany | 277/93 R |
| 605360 | 5/1926 | France | 277/220 |
| 81152 | 8/1934 | Sweden | 277/85 |
| 917693 | 2/1963 | United Kingdom | 277/81 S |

OTHER PUBLICATIONS

Enlarged portion of p. 82 of Burgmann reference of record (see reference "AR" entered by the Examiner on Jul. 26, 1991).

Burgmann, Mechanical Seals Design Manual 10, Edition E 5000–05/77, circa 1977.

Robert Bezak, "Design and Application of Split Mechanical End Face Seals", *Journal of the American Society of Lubrication Engineers,* Jun. 1978, p. 304.

*Primary Examiner*—Allan N. Shoap

[57] ABSTRACT

A split mechanical face seal comprising a pair of seal rings each comprising split ring segments secured about the circumference by securing means; the rings are non-ridgedly supported in an axial direction by resilient support means; at least one of the support means comprises biasing means axially biasing the sealing surface of the rings together.

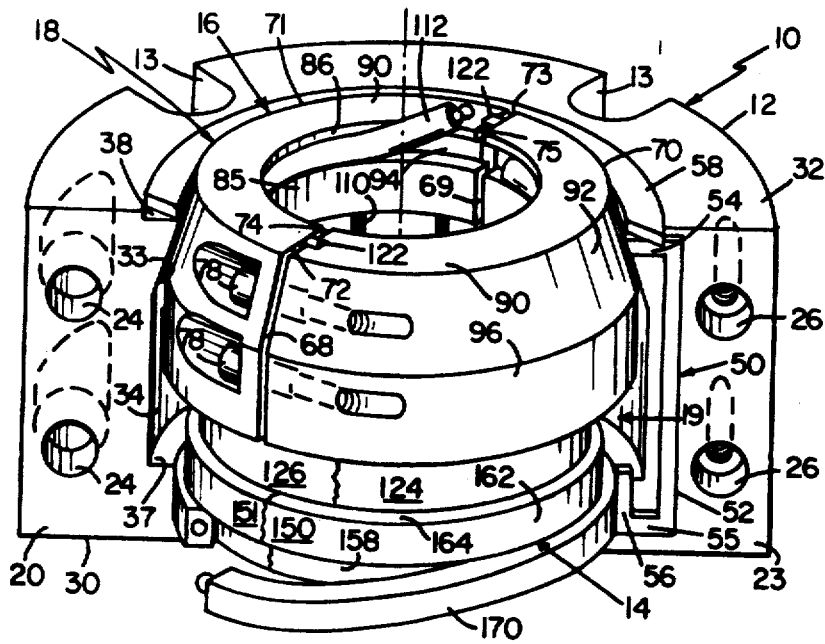

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 2, 4 is confirmed.

Claims 3, 5 and 6 are determined to be patentable as amended.

Claims 7-19, dependent on an amended claim, are determined to be patentable.

New claims 20-23 are added and determined to be patentable.

3. The split seal claimed in claim 1 further characterized in that said biasing means comprises compression springs [contacting] *biasing* a radially extending wall of one of said rings on the side opposite the sealing surface of said ring, *for floatingly non-rigidly supporting said rings axially in spaced floating relation from rigid walls of said seal.*

5. The split seal claimed in claim 4 further characterized in that at least one of said resilient support means for said rings comprises one said elastomeric member, *and* at least the other of said resilient support means comprises compression springs, said elastomeric members being positioned between and contacting axially extending walls of said rings and opposed axially extending rigid walls of said seal and further positioned between radially extending walls of said rings on the sides thereof opposite said sealing surfaces and opposed radially extending rigid walls of said seal, at least said one elastomeric member contacting the radially extending wall of one said ring and the opposed radially extending rigid wall of said seal between which it is positioned, and said compression springs [contacting] *biasing* a radially extending wall of the other of said rings on the side opposite the sealing surface thereof and an opposed radially extending rigid wall of said seal, said elastomeric members and said springs *floatingly* non-rigidly supporting said rings radially as well as axially in spaced *floating* relation from all rigid walls of said seal.

6. The split seal claimed in claim 5, comprising a seal gland comprised of gland halves fastened together and defining a chamber *for* housing said seal ring assemblies therein, *wherein* one of said seal ring assemblies [comprises one of said seal rings] *is* supported by said gland in said chamber and in which the other of said seal ring assemblies comprises a holder within said chamber comprised of holder halves fastened together and adapted to be connected to and supported within said gland on a shaft extending into said gland, said holder supporting [the other] *one* of said rings for rotation of said ring with said shaft, further characterized in that said seal ring assemblies further comprise said elastomeric members supporting said seal rings and holding the segments thereof together, respectively, one in said holder and one in said gland with said seal rings spaced from the rigid walls of said holder and said gland respectively.

20. *The split seal claimed in claim 1 further characterized in that said comprises housing means for providing rigid radial and axial walls and wherein said rings are each engaged in said housing means by said securing means non-rigidly contacting and extending respectively about the outer circumference of each said ring segment and by said resilient support means respectively resiliently contacting and supporting each said ring segment in floating relationship to ones of said walls of said housing means, wherein said housing means comprises an axially split gland for mounting one said ring to an equipment to be sealed and an axially split rotor holder for mounting the other ring to the equipment shaft, wherein each said ring's segment comprise axially mating split faces, wherein said securing means and said support means comprise resilient members, wherein said segments of each said ring are resiliently secured by a respective said resilient member, and wherein said biasing means biases respective ones of said axial mating split faces into sealing alignment.*

21. *The split seal claimed in claim 1 further characterized in that said seal comprises a rigid means for housing said rings, and said biasing means comprises a plurality of compression springs interposed between said rigid means and said biased ring for biasing individual ones of said segments of said biased ring axially toward the other said ring.*

22. *The split seal claimed in claim 1 further characterized in that, for each said ring, respectively, each said sealing surface defines a face-seal side of said ring and the other side of each said ring defines a non-face-seal side of said ring, and wherein each said ring comprises at least two radially extending walls on the non-face-seal side thereof, one of said radial walls being axially displaced from the other radial wall and both being interconnected by an axially extending interconnecting wall which is located at least nominally at a first diameter, the more radially outward of the two radial walls terminating in an axial wall of said ring at a larger second diameter, and wherein said face-seal side of said ring extends radially up to and terminates at about said second diameter.*

23. *The split seal claimed in claim 1 further comprising a rotor holder axially split into segments, said rotor holder for mounting said segments of one of said rings to a shaft of an equipment to be sealed, further characterized in that said segments mounted in said rotor holder form a rotor ring; wherein said securing means and said support means each comprise an elastomeric member; wherein one said elastomeric member comprises a rotor elastomeric member for supporting said rotor ring in said rotor holder by sealingly engaging radial and axial walls of said rotor holder and at least an axial wall of said rotor ring against fluid flow therebetween; further comprising a second rotor elastomeric member provided in a groove on the interior of said rotor holder for fluid sealing engagement with the shaft of the equipment to be sealed, and an elastomeric holder gasket bein provided for capture between said rotor holder segments and in sealing contact with and having a lower durometer than said second rotor elastomeric member.*

* * * * *